United States Patent [19]
Arai et al.

[11] Patent Number: 5,252,685
[45] Date of Patent: Oct. 12, 1993

[54] RTV ORGANOPOLYSILOXANE COMPOSITIONS FOR USE AS CORK CHIP BINDERS AND BONDED CORK CHIP ARTICLES

[75] Inventors: Masatoshi Arai; Tsuneo Kimura, both of Annaka; Kazuyuki Suzuki, Usui; Norihide Matsuyama, Toyonaka, all of Japan

[73] Assignee: Shin-Etsu Chemical Co., Ltd., Tokyo, Japan

[21] Appl. No.: 729,297

[22] Filed: Jul. 12, 1991

[30] Foreign Application Priority Data

Jul. 13, 1990 [JP] Japan .................... 2-186890

[51] Int. Cl.$^5$ .............................. C08G 77/38
[52] U.S. Cl. .................... 525/477; 428/402; 528/17
[58] Field of Search ............ 528/17; 525/477; 428/402

[56] References Cited

U.S. PATENT DOCUMENTS 3,862,919  1/1975  Nitzshe et al. ............ 525/477
5,091,484  2/1992  Colas et al. ................ 528/17

*Primary Examiner*—Melvyn I. Marquis
*Assistant Examiner*—D. Aylward
*Attorney, Agent, or Firm*—Millen, White, Zelano & Branigan

[57] ABSTRACT

A binder for cork chips is provided by an RTV organopolysiloxane composition comprising (1) a diorganopolysiloxane blocked with an alkoxysilyl group at either end of its backbone, (2) a crosslinking agent in the form of an alkoxysilane or a partial hydrolysate thereof, (3) an organic titanate, (4) a network polysiloxane comprising triorganosiloxy and $SiO_2$ units and having a terminal SiOH group blocked with an alkoxysilyl group, and (5) an epoxy-modified alkoxysilane or a partial hydrolysate thereof. Cork plugs are obtained by mixing the composition with cork chips followed by molding and curing.

20 Claims, No Drawings

RTV ORGANOPOLYSILOXANE COMPOSITIONS FOR USE AS CORK CHIP BINDERS AND BONDED CORK CHIP ARTICLES

This invention relates to a room temperature vulcanizable organopolysiloxane composition for use as a cork chip binder. It also relates to a bonded cork chip article, especially plug, obtained by mixing the composition with cork chips and curing the mixture.

BACKGROUND OF THE INVENTION

Cork plugs traditionally used in the art for plugging bottles and containers were punched out of natural cork oak bark. Such cork plugs widely vary in quality as often found in natural products. A choice of cork plugs of acceptable quality is uneconomical because rejected cork plugs account for a substantial proportion. Moreover, the price of natural cork material is increasing in these years. Besides, pitch is always associated with natural cork material and causes some drawbacks of scaling off and leakage.

Under the circumstances, it was proposed to form cork plugs from pressed or bonded cork material obtained by molding cork chips with the aid of a binder. The bonded cork plugs received high reputation with respect to quality consistency, ease of working, sealing tightness, and cost.

Urethane and epoxy base binders were widely used as the binders for bonded cork material. Urethane base binders, however, suffered from the problems of carcinogenicity ascribed to isocyanate and dimensional stability (leakage due to shrinkage). Also, epoxy base binders suffered from the problems of give, resilience, temperature (especially low temperature) stability, and dimensional stability. Thus, both types of binders have many problems concerning important functions for use as plugs.

SUMMARY OF THE INVENTION

The present invention has been made in order to overcome the problems of the prior art cork chip binders, and its object is to provide a room temperature vulcanizable (RTV) organopolysiloxane composition which cures to mechanically strong, nontoxic products which when used as bottle or container plugs, do not impair the organoleptic properties of the contents which will come in contact therewith, especially taste and flavor of food and thus meet the functional requirements of a cork chip binder. Another object is to provide a bonded cork chip article using the composition as a binder. A further object is to provide a molded plug of bonded cork chip material.

Having made investigations on RTV silicone rubber compositions useful as a cork chip binder, the inventors have found that compositions of the de-alcohol type are optimum due to non-toxicity, that the use of an organic titanate catalyst, typically tetraethoxy-titanuium instead of organometallic condensation catalysts commonly used for this type of composition does not impair the organoleptic properties of the contents, typically wine, that an epoxy-modified alkoxysilane or a partial hydrolysate thereof is effective in improving the adhesion to cork chips without impairing the organoleptic properties of the contents, typically wine, and that the addition of a network polysiloxane comprising triorganosiloxy and $SiO_2$ units and having a terminal SiOH group blocked with a mono-, di- or trialkoxysilyl group imparts sufficient strength to the silicone composition for use as a cork chip binder without impairing workability, when the use of reinforcing silicon dioxide filler is still insufficient to provide strength.

By mixing cork chips with an RTV organopolysiloxane composition using the above-mentioned components as a binder and molding the mixture, there are obtained cured products of bonded cork having acceptable properties regarding food safety, organoleptic inertness, give, resilience, and temperature stability. The cured products can be shaped into plugs which meet the important functional requirements as food container plugs.

Briefly stated, the present invention provides an RTV organopolysiloxane composition for use as a cork chip binder comprising (1) 100 parts by weight of a diorganopolysiloxane blocked with an alkoxysilyl group at either end of its backbone, (2) 1 to 25 parts by weight of an alkoxysilane of the general formula:

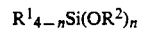

wherein $R^1$ and $R^2$, which may be identical or different, are independently selected from substituted or unsubstituted monovalent hydrocarbon groups, and n is equal to 3 or 4, or a partial hydrolysate thereof, (3) 0.01 to 10 parts by weight of an organic titanate ester, (4) 0.1 to 50 parts by weight of a network polysiloxane comprising triorganosiloxy and $SiO_2$ units and having a terminal SiOH group blocked with an alkoxysilyl group, and (5) 0.1 to 10 parts by weight of an epoxy modified alkoxysilane or a partial hydrolysate thereof.

In a second aspect, the present invention provides a bonded cork chip article which is obtained by mixing the composition with cork chips and curing the mixture. Most often, the bonded cork chip article is a plug.

DESCRIPTION OF THE PREFERRED EMBODIMENTS

As mentioned above, the composition of the present invention is most useful as a binder for bonding cork chips to form bonded cork plugs. The cork plugs are most often used to plug bottles and containers filled with edible contents, for example, food and alcoholic and non-alcoholic beverages, typically wine. Therefore, the following description uses the term "contents" in this sense.

The first and second components of the organopolysiloxane composition of the present invention are well-known components commonly used in RTV organopolysiloxane compositions. They are designed such that an alkoxy group in the first component and an alkoxy group in the second component undergo hydrolysis with moisture in the ambient air, thereby condensing into a rubbery elastomer.

More particularly, the first component is a diorganopolysiloxane blocked with an alkoxysilyl group at either end of its backbone, which is represented by the following general formula.

In the formula, R, R' and R" are substituted or unsubstituted monovalent hydrocarbon groups having 1 to 10 carbon atoms, preferably 1 to 8 carbon atoms, for example, alkyl group such as methyl, ethyl, propyl and butyl, cycloalkyl groups such as cyclohexyl, alkenyl groups such as vinyl and allyl, aryl groups such as phenyl and tolyl, and substituted ones of these groups in which some hydrogen atoms are replaced by halogen atoms or the like such as 3,3,-trifluoropropyl. R, R' and R" may be identical or different. Letter n in the formula is an integer of at least 10 such that the diorganopolysiloxane may have a viscosity of 25 to 500,000 centistokes (cSt) at 25° C., preferably 1,000 to 100,000 cSt at 25° C., and m is an integer of 2, 1 or 0. Preferably R" is a group having a relatively low molecular weight because hydrolysis with moisture in the air does not readily occur and rubber curing is significantly retarded unless R"O- is a readily hydrolyzable alkoxy group. For this reason, R" is preferably an alkyl group such as methyl, ethyl and propyl, a cycloalkyl group such as cyclohexyl, an alkenyl group such as vinyl and allyl, an aryl group such as phenyl, and substituted one of these groups in which some hydrogen atoms are replaced by halogen atoms or the like, provided that these groups have up to 6 carbon atoms. The most preferred R" groups are methyl and ethyl because of no influence on the organoleptic properties of edible contents.

The second component is an alkoxysilane or a partial hydrolysate thereof. It serves as a crosslinking agent in the composition of the invention. It is represented by the following general formula.

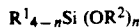

In the formula, $R^1$ and $R^2$, which may be identical or different, are independently selected from substituted or unsubstituted monovalent hydrocarbon groups having 1 to 10 carbon atoms, preferably 1 to 8 carbon atoms, as enumerated above for R, R' and R", and letter n is equal to 3 or 4. The most preferred groups represented by $R^1$ and $R^2$ are methyl and ethyl because of no influence on the organoleptic properties of the edible contents which will come in contact with the composition.

Examples of the alkoxysilane and partial hydrolysate thereof include tetramethoxysilane, tetraethoxysilane, methyltri(methoxy)silane, vinyltri(methoxy)silane, phenyltri(ethoxy)-silane, propyltri(methoxy)silane, methyltri(ethoxy)silane, vinyltri(ethoxy)silane, 3,3,3-trifluoropropyl(methoxy)silane, 3-chloropropyl(methoxy)silane, methyltri(methoxy-ethoxy)silane, methyltri(ethoxyethoxy)silane, and partial hydrolysates thereof. They may be obtained by subjecting corresponding alcohols and halosilanes to dehydrochlorination reaction using organic amines such as triethylamine and dimethylaniline as an acid acceptor.

The second component is used in an amount of 1 to 25 parts by weight per 100 parts by weight of the first component. Compositions containing less than 1 part by weight of component (2) per 100 parts by weight of component (1) will gel during their preparation or storage, resulting in elastomers having undesirable physical properties. Compositions containing more than 25 parts by weight of component (2) per 100 parts by weight of component (1) show an increased shrinkage factor upon curing and result in cured products with less resiliency.

The third component of the present composition is an organic titanate ester which acts as a curing catalyst in the composition. Examples of the titanate include tetraorganotitanates such as tetramethoxytitanium, tetraethoxytitanium, tetraisopropoxytitanium, tetrabutoxytitanium, tetra-2-ethylhexyl titanate, tetra(isopropenyloxy)titanate and titanium complexes such as triethanolamine titanate, dimethoxytitaniumdiacetylacetonate and diethoxytitaniumdiacetylacetonate. Preferred among these organic titanates is tetraethoxytitanium represented by chemical structure: Ti(OCH$_2$C$_3$)$_4$ because of no influence on the organoleptic properties of the edible contents which will come in contact with the composition.

The third component is used in an amount of 0.01 to 10 parts by weight, preferably 0.1 to 5 parts by weight per 100 parts by weight of the first component. Less than 0.01 part by weight of component (3) per 100 parts by weight of component (1) is ineffective for its purpose. That is, when the composition is exposed to air, it takes a long time until a tack-free skin is formed and internal curing is retarded. Compositions containing more than 10 parts by weight of component (3) per 100 parts by weight of component (1) form a skin within a too short time of several seconds to work with and are unsuitable for storage in uncured state.

The fourth component is a network polysiloxane comprising triorganosiloxy and SiO$_2$ units and having a terminal SiOH group blocked with a mono-, di- or trialkoxysilyl group. It is a reinforcement effective for imparting sufficient strength to the silicone composition for use as a cork chip binder without impairing workability, when the use of reinforcing silicon dioxide filler is still insufficient to provide strength.

The basic structure of the network polysiloxane may be synthesized by cohydrolysis of triorganochlorosilanes and tetrachlorosilane or cohydrolysis of triorganoalkoxysilanes and tetraalkoxysilanes. The triorganochlorosilanes include trimethylchlorosilane, vinyldimethylchlorosilane, phenyldimethylchlorosilane, allyldimethylchlorosilane, divinylmethylchlorosilane, trivinylchlorosilane, triphenylchlorosilane, etc. The triorganoalkoxysilanes include trimethylmethoxysilane, vinyldimethylmethoxysilane, phenyldimethylethoxysilane, allyldimethylmethoxysilane, divinylmethylmethoxysilane, trivinylmethoxysilane, triphenylmethoxysilane, trimethylpropoxysilane, trimethylbutoxysialne, etc. The tetraalkoxysilanes include tetramethoxysilane, tetraethoxysilane, tetrapropoxysilane, tetrabutoxysilane, etc.

The network polysiloxanes may be synthesized, for example, by adding dropwise a mixture of a trialkylchlorosilane and tetrachlorosilane or a mixture of a triorganoalkoxysilane and a tetraalkoxysilane to a mixture of water and an organic solvent such as benzene and toluene. The polysiloxanes as produced has an SiOH group as a terminal substituent. By reacting this terminal SiOH group with an alkoxysilane such as a tetraalkoxysilane, organotrialkoxysilane, and diorganodialkoxysilane, the polysiloxanes are converted into network polysiloxanes comprising triorganosiloxy and SiO$_2$ units and having a terminal SiOH group blocked with a triorganomonoalkoxysilyl, organodialkoxysilyl or trialkoxysilyl group. The organo groups in the alkoxysilanes used for blocking the terminal SiOH group may be the same substituted or unsubstituted monovalent hydrocarbon group as previously defined for R, R' and R", and the alkoxy groups may be the same as the above-mentioned OR" group.

The fourth component is used in an mount of 0.1 to 50 parts by weight, preferably 1 to 20 parts by weight per 100 parts by weight of the first component. Less than 0.1 part by weight of component (4) per 100 parts by weight of component (1) is ineffective for its purpose as a reinforcement enhancing agent. Compositions containing more than 50 parts by weight of component (4) cure to products having less rubbery properties.

The fifth component is an epoxy-modified alkoxysilane or a partial hydrolysate thereof and effective to impart to the composition an ability to bond cork chips therewith.

In the epoxy-modified alkoxysilanes, the epoxy-containing substituent group may be a glycidoxy group

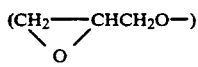

or 3,4-epoxy-cyclohexyl group

for example, while the alkoxy group may be the same as -OR" group in component (1). Illustrative, non-limiting examples of the epoxy-modified alkoxysilane are given below.

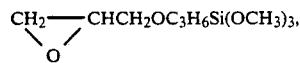

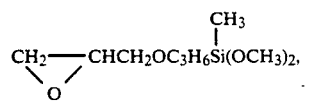

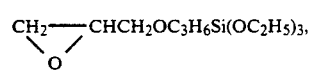

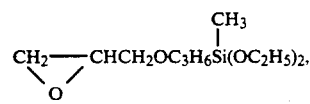

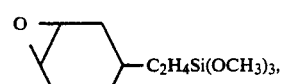

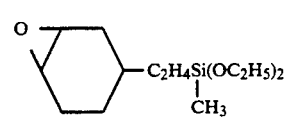

The fifth component is used in an amount of 0.1 to 10 parts by weight, preferably 1 to 5 parts by weight per 100 parts by weight of the first component. Less then 0.1 part by weight of component (5) per 100 parts by weight of component (1) is ineffective for its purpose as a bond enhancing agent. Compositions containing more than 10 parts by weight of component (5) cure to products having less rubbery properties.

The composition of the present invention is obtained as a one part RTV organopolysiloxane composition by evenly mixing predetermined amounts of components (1) to (5) in a dry atmosphere. The composition is also available as a two part RTV organopolysiloxane composition by packaging a uniform mixture of components (1), (4) and (5) as one part and a uniform mixture of components (2) and (3) as a separate part wherein the two parts are to be combined on use. Upon exposure to the ambient air, the composition undergoes crosslinking reaction due to moisture in the air, curing to a rubbery elastomer.

Moreover, the composition of the present invention may contain various additives, for example, reinforcing fillers such as fumed silica, precipitated silica, titanium dioxide, aluminum oxide, quartz powder, talc, and bentonite; fibrous fillers such as glass fibers and organic fibers; coloring agents, heat resistance modifiers such as red iron oxide and cerium oxide; low-temperature resistance modifiers; thixotropic agents such as polyethers; and dewatering agents. These optional additives may be used in adequate amounts for their purposes. In this case, the reinforcing filler is preferably blended in an amount of 5 to 50 parts by weight, particularly 10 to 30 parts by weight per 100 parts by weight of the first component. Less amount of the filler may result in elastomers having low mechanical strength. Too much amount of the filler may cause low fluidity.

Bonded cork chip masses are generally obtained by mixing the RTV organopolysiloxane composition with cork chips and curing the mixture. More particularly, cork chips are mixed with a composition containing all components (1) to (5) to form a uniform mixture. Alternatively, in the case of a two part composition, cork chips are blended in either one or both of the mixture of components (1), (4) and (5) and the mixture of components (2) and (3) whereby the two parts are combined on use.

One preferred embodiment uses 5 to 50 parts by weight, more preferably 15 to 25 parts by weight of the organopolysiloxane composition per 100 parts by weight of cork chips. The cork chips preferably have a particle size of up to 10 mm and a water content of up to 10% by weight in oven dry weight. Cork chips having a water content of more than 10% by weight are undesirable because the organopolysiloxane composition will undergo hydrolysis and deficient bond can be incurred due to evaporation of water during molding.

A mixture of the organopolysiloxane composition and cork chips is molded and cured to a suitable shape. Room temperature curing is acceptable. But, since cork chips are irregular in shape, heat curing is preferred in order to cover cork chips with the binder over their entire surface to establish a firmer bond. Preferred heat curing conditions include 40° to 120° C. and 1 to 24 hours, more preferably 60° to 80° C. and 2 to 3 hours.

Plugs are obtained by molding the binder-cork mixture into a plate or rod shape. It is recommended to compress the mixture in the mold to a volume of about ⅓ to 1/7 from the original volume.

EXAMPLES

Examples of the present invention are given below together with comparative examples, by way of illustration and not by way of limitation. All parts are by weight and the viscosity is a measurement at 25° C.

EXAMPLE 1 AND COMPARATIVE EXAMPLE 1

The composition of Example 1 was prepared by mixing 80 parts of dimethylpolysiloxane blocked with a trimethoxysilyl group at each end of its backbone having a viscosity of 900 cSt with 10 parts of fumed silica and 8.0 parts of a cohydrolysate of trimethylchlorosilane and tetrachlorosilane having a terminal SiOH group blocked with a trimethoxysilyl group for 2 hours at 150° C. in vacuum and then cooling the mixture to room temperature in dry nitrogen atmosphere. The mixture was blended with 6.0 parts of vinyltriethoxysilane, 1.0 part of tetraethoxytitanium, and 1.0 part of γ-glycidoxypropyltrimethoxysilane in an anhydrous condition, obtaining the composition of Example 1.

For comparison purposes, 80 parts of dimethylpolysiloxane blocked with a hydroxyl group at each end of its backbone having a viscosity of 900 cSt was mixed with 10 parts of fumed silica and 8.0 parts of a cohydrolysate of trimethylchlorosilane and tetrachlorosilane for 2 hours at 150° C. in vacuum and then the mixture was cooled down to room temperature in a dry nitrogen atmosphere. The mixture was further blended with 6.0 parts of vinyltriethoxysilane, 1.0 part of tetraethoxytitanium, and 1.0 part of γ-glycidoxypropyltrimethoxysilane in an anhydrous condition, obtaining the composition of Comparative Example 1.

The compositions were cast over a mold to form sheets of 2.0 mm thick and allowed to stand for 7 days in an atmosphere of 20° C./50% RH, obtaining rubbery elastomer sheets. The sheets were examined for rubbery properties according to JIS K-6301, with the results shown in Table 1.

To examine storage life, the compositions in uncured state were kept at 70° C. in an anhydrous condition for 120 hours. Thereafter they were molded into sheets of 2.0 mm thick and allowed to stand for 7 days in an atmosphere of 20° C./50% RH, obtaining rubbery elastomer sheets. The sheets were examined for rubbery properties as above, with the results shown in Table 1.

TABLE 1

|  | Comparative Example 1 | Example 1 |
| --- | --- | --- |
| Initial properties |  |  |
| Hardness, JIS-A | 40 | 39 |
| Elongation, % | 100 | 130 |
| Tensile strength, kgf/cm$^2$ | 16 | 21 |
| Aged properties |  |  |
| Hardness, JIS-A | Uncured | 25 |
| Elongation, % | Uncured | 210 |
| Tensil strength, kgf/cm$^2$ | Uncured | 21 |

EXAMPLE 2 AND COMPARATIVE EXAMPLE 2

The composition of Example 2 was prepared by mixing 80 parts of dimethylpolysiloxane blocked with a trimethoxysilyl group at each end of its backbone having a viscosity of 900 cSt with 12 parts of fumed silica and 8.0 parts of a cohydrolysate of trimethylchlorosilane and tetrachlorosilane having a terminal SiOH group blocked with a trimethoxysilyl group for 2 hours at 150° C. in vacuum and then cooling the mixture to room temperature in a dry nitrogen atmosphere. The mixture was blended with 3.0 parts of vinyltrimethoxysilane, 1.0 parts of tetraethoxytitanium, and 2.0 parts of γ-glycidoxypropyltrimethoxysilane in an anhydrous condition, obtaining the composition of Example 2.

For comparison purposes, 80 parts of dimethylpolysiloxane blocked with a trimethoxysilyl group at each end of its backbone having a viscosity of 900 cSt was mixed with 12 parts of fumed silica and 8.0 parts of a cohydrolysate of trimethylchlorosilane and tetrachlorosilane having a terminal SiOH group blocked with a trimethoxysilyl group for 2 hours at 150° C. in vacuum and then the mixture was cooled down to room temperature in a dry nitrogen atmosphere. The mixture was further blended with 3.0 parts of vinyltrimethoxysilane, 1.0 part of tetrapropoxytitanium, and 2.0 parts of γ-glycidoxypropyltrimethoxysilane in an anhydrous condition, obtaining the composition of Comparative Example 2.

The compositions were cast over a mold to form sheets of 2.0 mm thick and allowed to stand for 7 days in an atmosphere of 20° C./50% RH, obtaining rubbery elastomer sheets. The sheets were examined for rubbery properties according to JIS K-6301, with the results shown in Table 2.

To examine the influence on organoleptic properties, the compositions were molded into sheets of 0.5 mm thick and allowed to stand for one day in an atmosphere of 20° C./50% RH, obtaining rubbery elastomer sheets. The sheets were dipped in a 45% ethyl alcohol aqueous solution at 50° C. for 30 days, which was examined by an organoleptic test, with the results shown in Table 2.

TABLE 2

|  | Comparative Example 2 | Example 2 |
| --- | --- | --- |
| Hardness, JIS-A | 40 | 38 |
| Elongation, % | 100 | 110 |
| Tensile strength, kgf/cm$^2$ | 10 | 13 |
| Organoleptic test |  |  |
| Taste | Rejected | Pass |
| Smell | Rejected | Pass |

As is evident from Tables 1 and 2, the compositions of the present invention provide cured products which are excellent in physical properties both at the initial and after storage and acceptable in organoleptic influence.

Next, cork plugs having a diameter of 25.5 mm and a height of 21.0 mm were prepared by mixing 20 parts of each composition of Examples 1 and 2 as a binder with 100 parts of cork chips having a particle size of 5 to 10 mm and a water content of 7% by weight and compression molding the mixture at 60° C. for 2 hours (compressed to 1/5 of the initial volume).

For comparison purposes, cork plugs were similarly prepared by mixing 7 parts of Cemedine #1500 epoxy resin as a binder and 13 parts of polyethylene glycol with 100 parts of the same cork chips as above and compression molding the mixture at 120° C. for 2 hours.

Further, a reference plug sample was obtained by punching natural cork in a conventional manner.

The cork plugs were examined for resilience, twisting torque, and tensile strength in X and Y directions by the following methods both at the initial and after degradation. The samples were degraded by immersing them in 60 vol % ethanol and water at 60° C. for 2 weeks. They were taken out of the ethanol or water, air dried for 4 hours, dried at 40° C. for 18 hours and then at 60° C. for a further 2 hours, and then cooled down before the test. The results are shown in Table 3.

Resilience

Measurement was made by using a metallic jig composed of two halves defining a cavity having an internal diameter of 24.0 mm, tightly fastening the jig halves together by bolts, forcedly inserting a cork plug into the cavity, and releasing the bolts whereupon the force applied by the cork plug was measured by means of a load cell.

Twisting torque

With a cork plug set in a torque meter, the upper end of the meter was rotated until the plug was broken.

Tensile strength

A dumbbell specimen of 3 T×16 W was pulled by means of a tensile tester to measure a force at breakage. Tensile strength of the pulling force at breakage divided by the cross sectional area. Y direction is the direction of compression during molding of cork plugs and X direction is perpendicular thereto. In the case of natural cork plugs, Y direction is parallel to the annular ring and X direction is perpendicular thereto.

TABLE 3

|  |  | Example 1 | Example 2 | Comparison (epoxy binder) | Reference (natural cork) |
|---|---|---|---|---|---|
| Initial properties | | | | | |
| Resilience, | | 36.41 | 43.15 | 21.50 | 17.57 |
| kg · f | | (40.2, 33.8) | (46.1, 37.2) | (25.0, 17.6) | (21.5, 12.4) |
| Twist torque, | | 50.0 | 53.6 | 41.4 | 34.3 |
| kg-cm | | (54, 46) | (56, 48) | (46, 35) | (40, 29) |
| Tensile | X | 16.73 | 17.58 | 9.70 | 13.11 |
| strength, | direction | (18.5, 14.8) | (19.1, 16.2) | (10.7, 9.4) | (19.2, 1.7) |
| $kg/cm^2$ | Y | 8.40 | 8.93 | 5.52 | 9.44 |
|  | direction | (10.2, 7.8) | (10.2, 8.1) | (6.2, 5.0) | (16.3, 0.8) |
| After ethanol immersion | | | | | |
| Twist torque, | | 17.9 | 18.6 | 16.0 | 15.5 |
| kg-cm | | (21, 17) | (20, 17) | (17, 15) | (17, 14) |
| Tensile | X | 10.92 | 11.11 | 8.10 | 9.33 |
| strength, | direction | (11.5, 10.0) | (11.9, 10.2) | (9.5, 6.8) | (13.1, 6.1) |
| $kg/cm^2$ | Y | 6.81 | 6.90 | 5.57 | 6.54 |
|  | direction | (8.5, 5.1) | (8.6, 5.4) | (6.5, 4.7) | (9.0, 3.7) |
| After water immersion | | | | | |
| Twist Torque, | | 27.9 | 28.1 | 24.8 | 22.7 |
| kg-cm | | (29, 26) | (29, 26) | (28, 20) | (25, 18) |
| Tensile | X | 13.35 | 13.63 | 9.25 | 10.82 |
| strength, | direction | (13.9, 9.8) | (14.2, 10.3) | (10.3, 8.0) | (11.6, 3.9) |
| $kg/cm^2$ | Y | 7.08 | 7.65 | 5.77 | 7.15 |
|  | direction | (8.9, 5.6) | (9.1, 5.8) | (6.7, 5.1) | (8.8, 4.1) |

Note: All the measurements are an average of 10 specimens and the maximum and minimum are shown in parentheses.

As is evident from Table 3, the bonded cork chip articles of the present invention perform well as cork plugs and show minimized variation in nature.

There has been described an RTV organopolysiloxane composition which is suitable as a cork chip binder since it presents nontoxic cured products having improved physical properties of give, resilience, and tensile strength, satisfactory temperature stability, and resistance against water and alcoholic solution and meeting the food safety and organoleptic requirements. Plugs molded from a mixture of the composition with cork chips fully meet the important functional requirements as cork plugs. Therefore, the bonded cork plugs of the invention are suitable for use with bottles filled with alcoholic beverages including whisky, brandy, wine, and sake as well as mineral water and refreshing beverage.

Although some preferred embodiments have been described, many modifications and variations may be made thereto in the light of the above teachings. It is therefore to be understood that within the scope of the appended claims, the invention may be practiced otherwise than as specifically described.

We claim:

1. A room temperature vulcanizable organopolysiloxane composition comprising:
   (1) 100 parts by weight of a diorganopolysiloxane blocked with an alkoxysilyl group at both ends of its backbone;
   (2) 1-25 parts by weight of an alkoxysilane of the formula:

$$R^1{}_{4-n}Si(OR^2)_n$$

wherein $R^1$ and $R^2$ are each independently selected from substituted or unsubstituted monovalent hydrocarbon groups, and n is equal to 3 or 4, or a partial hydrolysate thereof;
   (3) 0.01-10 parts by weight of an organic titanate ester;
   (4) 0.1-50 parts by weight of a network polysiloxane comprising triorganosiloxy and $SiO_2$ units and having a terminal SiOH group blocked with an alkoxysilyl group; and
   (5) 0.1-10 parts by weight of an epoxy-modified alkoxysilane or a partial hydrolysate thereof.

2. A composition of claim 1, wherein diorganopolysiloxane (1) is of the formula:

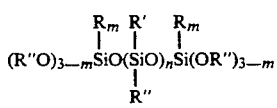

wherein R, R' and R" are each independently selected from substituted or unsubstituted monovalent hydrocarbon groups having 1 to 10 carbon atoms, n is an integer of at least 10, and m is an integer of 2, 1 or 0.

3. A composition of claim 2, wherein R, R' and R" are each independently methyl or ethyl.

4. A composition of claim 1, wherein $R^1$ and $R^2$ are each independently methyl or ethyl.

5. A composition of claim 1, wherein network polysiloxane (4) has a terminal SiOH group blocked with a monoalkoxyorganosilyl group, dialkoxyorganosilyl group or trialkoxysilyl group.

6. A composition of claim 1, further comprising a reinforcing filler.

7. A bonded cork chip article wherein the composition of claim 1 and cork chips are mixed and cured.

8. The article of claim 7 wherein 5 to 50 parts by weight of the composition is mixed with 100 parts by weight of cork chips.

9. The article of claim 7 wherein the cork chips have a particle size of up to 10 mm.

10. The article of claim 7 wherein the cork chips have a water content of up to 10% by weight in oven dry weight.

11. The article of claim 7 wherein curing is for 1 to 24 hours at 40° to 120° C.

12. The article of claim 7 wherein the mixture of the composition and cork chips is compressed by a factor of 3 to 7 in volume prior to curing.

13. The bonded cork chip article of claim 7 which is a plug.

14. A composition of claim 1, wherein said organic titanate ester is selected from the group consisting of tetramethoxytitanium, tetraethoxytitanium, tetraisopropoxytitanium, tetrabutoxytitanium, tetra-2-ethylhexyltitanate, tetra(isopropenyloxy)titanate, triethanolaminetitanate, dimethoxytitaniumdiacetylacetonate and diethoxytitaniumdiacetylacetonate.

15. A composition of claim 1, wherein said epoxymodified alkoxysilane is:

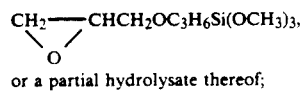
or a partial hydrolysate thereof;

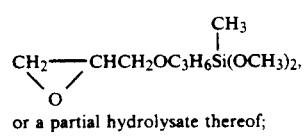
or a partial hydrolysate thereof;

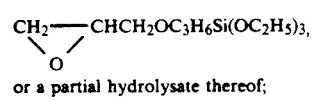
or a partial hydrolysate thereof;

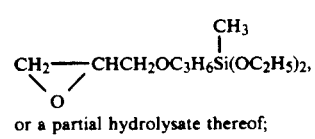
or a partial hydrolysate thereof;

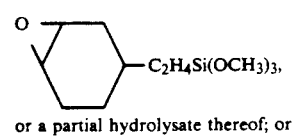
or a partial hydrolysate thereof; or

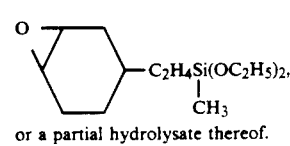
or a partial hydrolysate thereof.

16. A composition of claim 2, wherein R, R' and R" are each independently methyl, ethyl, propyl, butyl, cyclohexyl, vinyl, allyl, phenyl, or tolyl.

17. A composition of claim 1, wherein said alkoxysilane is tetramethoxysilane, tetraethoxysilane, methyltri(methoxy)silane, vinyltri(methoxy)silane, phenyltri(ethoxy)silane, propyltri(methoxy)silane, methyltri(ethoxy)silane, vinyltri(ethoxy)silane, methyltri(methoxyethoxy)silane, methyltri(ethoxyethoxy)silane, or a partial hydrolysate thereof.

18. A composition of claim 1, wherein said organic titanate ester is tetraethoxytitanium.

19. A composition of claim 6, wherein said composition contains 5–50 parts by weight of said reinforcing filler.

20. A room temperature vulcanizable organopolysiloxane composition comprising
(1) 100 parts by weight of a diorganopolysiloxane blocked with an alkoxysilyl group at both ends of its backbone, wherein said diorganopolysiloxane is of the formula:

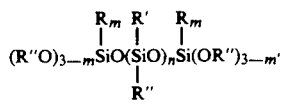

wherein R, R' and R" are each independently selected from substituted or unsubstituted monovalent hydrocarbon groups having 1 to 10 carbon atoms, n is an integer of at least 10, and m is an integer of 0, 1 or 2;

(2) 1–25 parts by weight of an alkoxysilane of the formula:

$$R^1{}_{4-n}Si(OR^2)_n$$

wherein $R^1$ and $R^2$ are each independently selected from substituted or unsubstituted monovalent hydrocarbon groups, and n is equal to 3 or 4, or a partial hydrolysate thereof;

(3) 0.01–10 parts by weight of an organic titanate ester selected from the group consisting of tetramethoxytitanium, tetraethoxytitanium, tetraisopropoxytitanium, tetrabutoxytitanium, tetra-2-ethylhexyltitanate, tetra(isopropenyloxy)titanate, triethanolaminetitanate, dimethoxytitaniumdiacetylacetonate and diethoxytitaniumdiacetylacetonate;

(4) 0.1–50 parts by weight of a network polysiloxane comprising triorganosiloxy and $SiO_2$ units and having a terminal SiOH group blocked with an alkoxysilyl group; and (5) 0.1–10 parts by weight of an epoxy-modified alkoxysilane or a partial hydrolysate thereof, wherein said epoxy-modified alkoxysilane is:

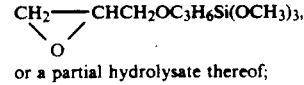
or a partial hydrolysate thereof;

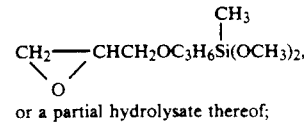
or a partial hydrolysate thereof;

-continued
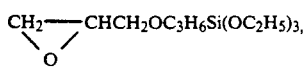
or a partial hydrolysate thereof;
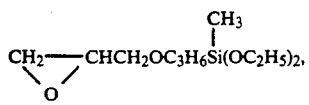
or a partial hydrolysate thereof;
-continued
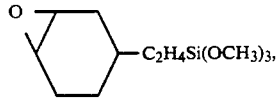
or a partial hydrolysate thereof; or
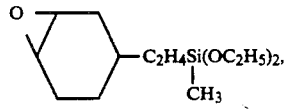
or a partial hydrolysate thereof.
* * * * *